(12) United States Patent
Nomura et al.

(10) Patent No.: US 7,531,255 B2
(45) Date of Patent: May 12, 2009

(54) THERMAL TREATMENT APPARATUS AND POWER GENERATION MODULE

(75) Inventors: Masatoshi Nomura, Fussa (JP); Osamu Nakamura, Kodaira (JP); Tsutomu Terazaki, Fussa (JP); Keishi Takeyama, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 932 days.

(21) Appl. No.: 10/951,334

(22) Filed: Sep. 27, 2004

(65) Prior Publication Data

US 2005/0069737 A1   Mar. 31, 2005

(30) Foreign Application Priority Data

Sep. 29, 2003   (JP) ............................. 2003-338469

(51) Int. Cl.
*H01M 8/06* (2006.01)
*B01J 19/00* (2006.01)
*H05B 1/02* (2006.01)

(52) U.S. Cl. .......................... 429/20; 422/199; 219/504

(58) Field of Classification Search .................. 429/19, 429/20; 422/189, 199; 219/504
See application file for complete search history.

(56) References Cited

U.S. PATENT DOCUMENTS

| 6,450,025 B1 | 9/2002 | Wado et al. |
| 6,946,113 B2 * | 9/2005 | Seaba et al. ............... 429/20 X |
| 2002/0150683 A1 | 10/2002 | Troian et al. |
| 2004/0244290 A1 | 12/2004 | Yamamoto et al. |

FOREIGN PATENT DOCUMENTS

| JP | 2003-45459 A | 2/2003 |
| JP | 2003-117409 A | 4/2003 |
| WO | WO 03/037781 A1 | 5/2003 |
| WO | WO 2004/037406 A1 | 5/2004 |

* cited by examiner

*Primary Examiner*—Stephen J. Kalafut
(74) *Attorney, Agent, or Firm*—Frishauf, Holtz, Goodman & Chick, P.C.

(57) ABSTRACT

A thermal treatment apparatus provided on a substrate includes a heat generating section the section includes a heat generating layer, a diffusion preventing layer which contacts one surface of the heat generating layer to prevent heat diffusion due to heat generation of the heat generating layer, and a cohering layer disposed between the substrate and the diffusion preventing layer.

15 Claims, 10 Drawing Sheets

THERMAL TREATMENT APPARATUS AND POWER GENERATION MODULE

CROSS-REFERENCE TO RELATED APPLICATIONS

This application is based upon and claims the benefit of priority from prior Japanese Patent Application No. 2003-338469, filed Sep. 29, 2003; the entire contents of which are incorporated herein by reference.

BACKGROUND OF THE INVENTION

1. Field of the Invention

The present invention relates to a thermal treatment apparatus to perform a thermal treatment in a furnace.

2. Description of the Related Art

Recently, it have been begun that fuel cells utilizing hydrogen as a fuel are applied to, for example, automobiles or portable devices as clean power supplies with high energy conversion efficiency.

The fuel cell is equipment which electrochemically reacts a fuel with oxygen in the air to directly extract electric energy from chemical energy. The fuel to be used for the fuel cell includes hydrogen, but it has handling and storing problems because it is in a gas state at room temperature. If liquid fuels such as alcohols and gasoline are used, the liquid fuels are reacted with high-temperature steam, which requires a reformer to extract hydrogen needed for power generation. In general, the reformer needs to reform the fuel in a high-temperature state.

Jpn. Pat. Appln. KOKAI Publication No. 2003-117409 describes, as a small chemical reacting furnace, a thermal treatment apparatus (temperature adjustment means) using a heating element such as a metal.

FIG. 13 shows a small reformer 100 including such a heating element. A chamber 101 is formed within the reformer 100, and a heating element 102 is provided in the chamber 101. The heating element 102 is conducted by lead wires 103, 104 from a power supply section 105. A resistive element temperature sensor 108 is disposed in the chamber 101, and wires 109, 110 of the resistive element temperature sensor 108 are connected to a temperature measurement section 111 where a thermal electromotive force is measured to measure the temperature in the chamber 101.

Electric power is supplied from the power supply section 105 to the heating element 102 through the lead wires 103, 104, and when the heating element 102 generates heat, water and a fuel supplied to the chamber through a supply pipe 106 are heated by the heating element 102, so that water and the fuel cause a reaction to produce hydrogen. In this connection, an optimum temperature range is generally present in the chemical reaction between water and the fuel. Thus, a signal representing a temperature measured by the temperature measurement section 111 is input to a control section 112, and the control section 112 controls the electric power of the power supply section 105 in accordance with the input signal, thereby maintaining not only the temperature of the heating element 102 but also the temperature in the chamber 101 within the optimum temperature range.

As described above, in the configuration where the heating element 102 and the resistive element temperature sensor 108 are disposed in the chamber 101, the lead wires 103, 104 and the wires 109, 110 need to be led into the chamber from the outside, which involves a problem of a complicated connection structure due to increase in the number of wires, so that this problem becomes obvious particularly when the reformer needs to be stored in a decompressed container.

Furthermore, it is desirable that all heat energy produced by the heating element 102 should be used for the reaction between water and the fuel, but the lead wires 103, 104 and the wires 109, 110 are low-resistant conductors and therefore at least partially contain a metal, which poses a problem that the heat energy in the chamber 101 is lost because metals are highly heat-conductive and conduct heat in the chamber 101 out of the reformer 100, and a problem of a decrease in temperature measurement precision.

An advantage of the present invention is to provide a thermal treatment apparatus and a power generation module which enable the configuration to be simplified and heat loss in the furnace of the reformer to be reduced and which raise the temperature measurement precision.

BRIEF SUMMARY OF THE INVENTION

A thermal treatment apparatus according to one aspect of the present invention is provided on a substrate, and the thermal treatment apparatus comprises:
a heat generating section which comprises:
a heat generating layer;
a diffusion preventing layer which contacts one surface of the heat generating layer to prevent heat diffusion due to heat generation of the heat generating layer; and
a cohering layer disposed between the substrate and the diffusion preventing layer.

A power generation module according to another aspect of the present invention comprises:
a heat generating section which comprises a heat generating layer, a diffusion preventing layer which contacts one surface of the heat generating layer to prevent diffusion of the heat generating layer due to heat generation of the heat generating layer, and a cohering layer disposed between a substrate and the diffusion preventing layer;
a reformer which reforms a fuel into hydrogen by the heat generation of the heat generating section; and
a fuel cell which generates electric power with hydrogen produced by the reformer.

A power generation module according to a further aspect of the present invention comprises:
a heat generating section which comprises a resistive layer which changes resistance in accordance with a change in temperature, a diffusion preventing layer which contacts one surface of the resistive layer to prevent heat diffusion of the resistive layer, and a cohering layer disposed between a substrate and the diffusion preventing layer;
a reformer which reforms a fuel into hydrogen by the heat generation of the heat generating section; and
a fuel cell which generates electric power with hydrogen produced by the reformer.

According to the thermal treatment apparatus and the power generation module in the aspects of the present invention, the diffusion preventing layer can prevent the heat generating layer from being thermally diffused when the heat generating layer (or resistive layer) generates heat, so that a resistance value of the heat generating layer hardly changes with the temperature changes, and for example, if a predetermined voltage is applied, the heat generating layer can always be heated to a desired temperature. Further, in order to have better cohesion properties between such a diffusion preventing layer and the substrate, a cohering layer is provided therebetween to prevent the heat generating section from being separated from the substrate.

Thus, in the heat generating section, because the resistance change and temperature change are dependent on each other, the resistance of the heat generating section or physicality contributing to the resistance, for example, a current value, can be measured to measure the temperature of the heat generating section in some cases, so that the heat generating section can also be used as a temperature sensor. It is therefore unnecessary to provide a temperature measurement section separately from the heat generating section in the thermal treatment apparatus, thus requiring no wire to be exclusively provided for the temperature measurement section. Therefore, fewer wires are required than before, thus reducing heat loss from a heat treating furnace and allowing temperature measurement accuracy to be enhanced.

DETAILED DESCRIPTION OF THE INVENTION

Figure 1:
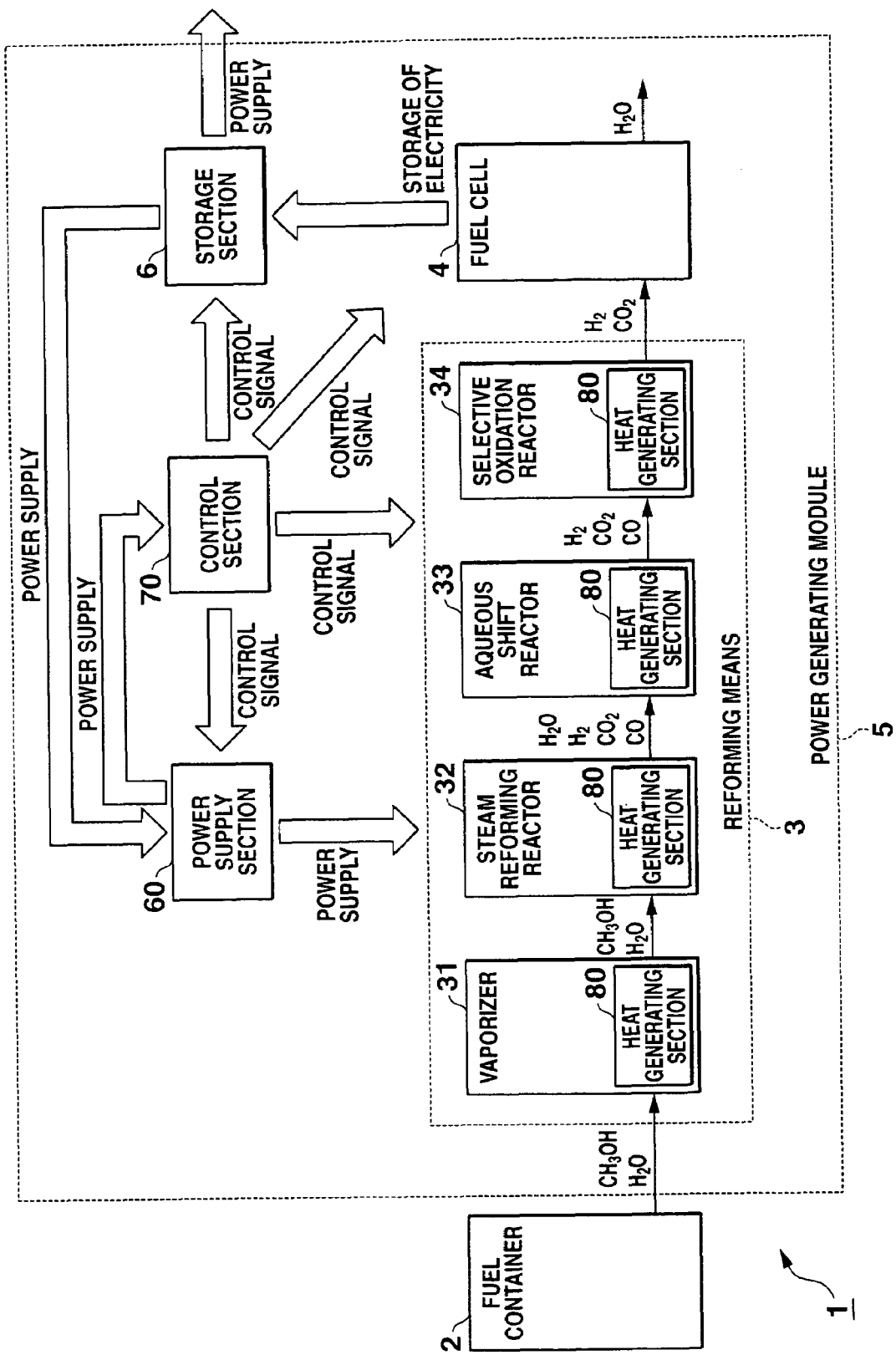
FIG. 1 is a block diagram showing a basic configuration of a power generation system to which heat generating sections of the present invention are applied.

A best mode for carrying out the present invention will hereinafter be described with reference to the drawings. However, the scope of the invention is not limited to examples shown in the drawings.

Figure 2:
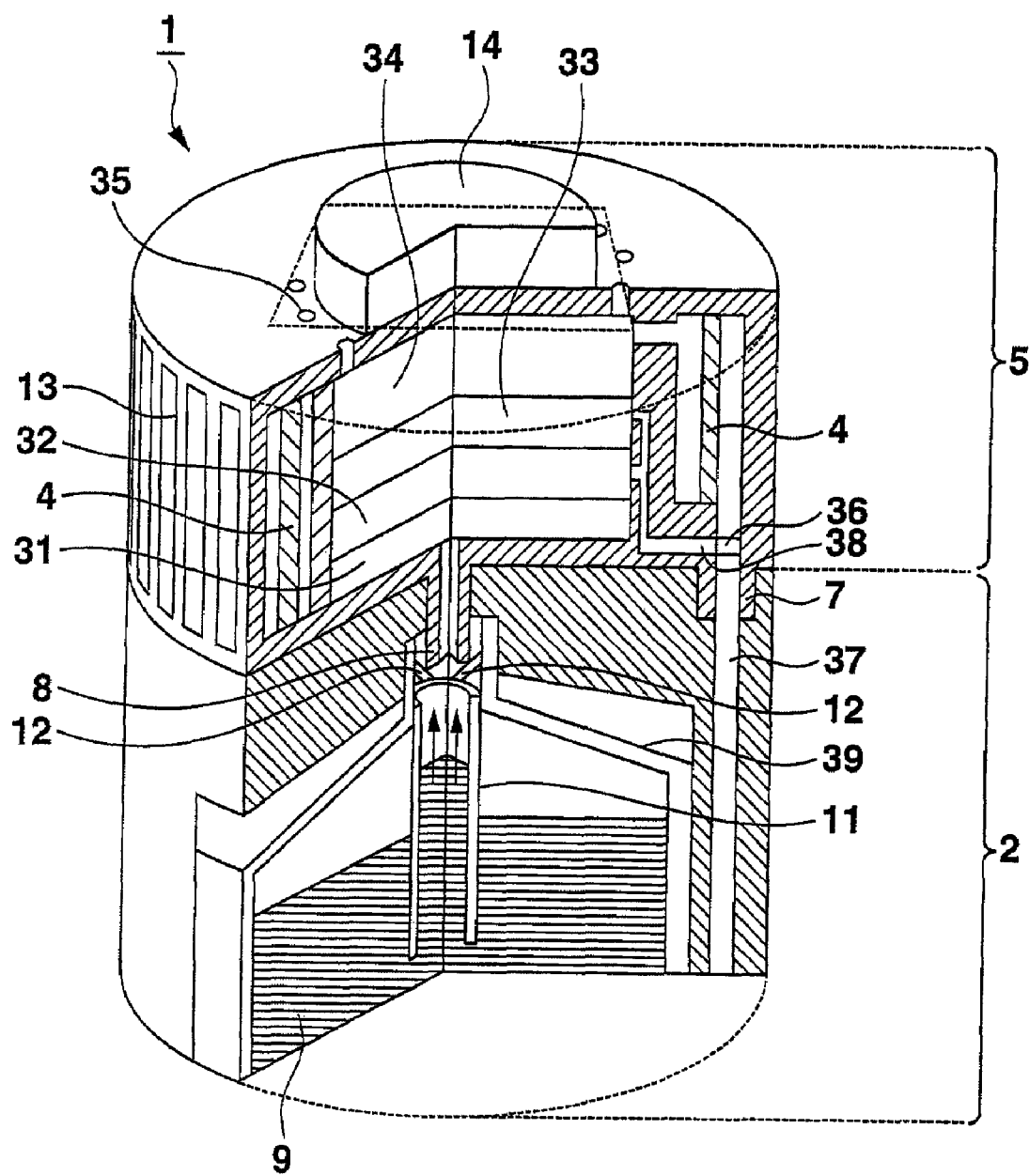
FIG. 2 is a perspective view showing a schematic internal configuration of the power generation system 1.

FIG. 1 is a block diagram showing a basic configuration of a power generation system 1 to which heat generating sections or heating sources 80 according to the present invention are applied, and FIG. 2 is a perspective view schematically showing an internal configuration by partially breaking the power generation system 1.

The power generation system 1 includes a fuel container 2 and a power generation module 5 which is removably attached to the fuel container 2. The power generation module 5 has a reforming means or section 3 (reformer) which reforms a chemical fuel (fuel to be heat-treated), a fuel cell 4 which generates electric power with the fuel reformed by the reforming means 3, and a storage section 6 which stores the electric power generated by the fuel cell 4 and outputs it as required. A power supply section 60 distributes to the whole power generation module 5 the electric power supplied from the storage section 6. A control section 70 electronically controls the reforming means 3, the fuel cell 4, the storage section 6 and the power supply section 60. The heat generating sections 80 heat the reforming means 3 to a suitable temperature.

The fuel container 2 stores a fuel 9 (FIG. 2) which is a mixture of the chemical fuel and water. The chemical fuel includes alcohols such as methanol ($CH_3OH$) and ethanol ($C_2H_5OH$) and carbon compounds such as gasoline having hydrogen as part of components. In the present embodiment, the fuel 9 stored in the fuel container 2 is a mixture in which methanol and water are uniformly mixed at an equal mol.

As shown in FIG. 2, the power generation module 5 also includes at the head a terminal 14 which transmits an electric output from the storage section 6 to the outside. The module 5 and further includes, at positions opposite to the fuel container 2, a protrusion 7 to couple a pipe 37 which exchanges water with the fuel container 2, and a protrusion 8 to take in the fuel from a supply pipe 11 which supplies the fuel 9 in the fuel container 2. The protrusion 7 and the protrusion 8 are engaged with the fuel container 2 to attach the power generation module 5 to the fuel container 2. When the fuel container 2 is coupled to the power generation module 5, the protrusion 8 breaks a sealing film 12 at an end of the supply pipe 11, and the fuel 9 may be supplied to the power generation module 5 due to a capillary phenomenon in the supply pipe 11.

The reforming means 3 includes a vaporizer 31, a steam reforming reactor 32, an aqueous shift reactor 33 and a selective oxidation reactor 34. These members 31, 32, 33 and 34 respectively have structures in which a plurality of small substrates made of glass, silicon, an aluminum alloy and the like are affixed together, and also have the heat generating sections 80. The active members 31, 32, 33 and 34, when the fuel or a fluid produced by reforming the fuel runs through a groove as a flow path provided between the affixed substrates, function as micro reactors which heat the fluid with the heat generating sections 80 to vaporize the fluid or cause a chemical reaction in at least part of the fluid.

The vaporizer 31 is a furnace where the fuel 9 supplied from the fuel container 2 is heat-treated. Therefore, the vaporizer 31 causes the heat generating section 80 to heat the fuel 9 supplied from the fuel container 2 to about 80° C. to 130° C., thereby evaporating the fuel 9. An air-fuel mixture vaporized by the vaporizer 31 is supplied to the steam reforming reactor 32.

The reactor 32 is a reaction furnace where the air-fuel mixture supplied from the vaporizer 31 is heat-treated. The heat generating section 80 increases the temperature in the steam reforming reactor 32 to 250° C. to 300° C., so that the air-fuel mixture supplied from the vaporizer 31 is reformed into a hydrogen gas and a carbon dioxide gas by a reforming catalyst as in the chemical formula (1).

$$CH_3OH+H_2O \rightarrow 3H_2+CO_2 \qquad (1)$$

The air-fuel mixture supplied from the vaporizer 31 may not be completely reformed into the hydrogen gas and carbon dioxide gas in some cases, and a small amount of a carbon monoxide gas is produced in the steam reforming reactor 32 as in the chemical formula (2).

$$2CH_3OH+H_2O \rightarrow 5H_2+CO+CO_2 \qquad (2)$$

In addition to the hydrogen gas, carbon dioxide gas and carbon monoxide gas produced in the steam reforming reactor 32, unreacted steam is supplied to the aqueous shift reactor 33. The details of the steam reforming reactor 32 will be described later.

The aqueous shift reactor 33 is a reaction furnace where the air-fuel mixture (including hydrogen gas, carbon dioxide gas, steam and carbon monoxide gas) supplied from the steam reforming reactor 32 is heat-treated. Therefore, the heat generating section 80 heats the inside within the aqueous shift reactor 33 to 160° C. to 200° C. such that the aqueous shift reactor 33 causes an aqueous shift reaction of carbon monoxide gas out of the air-fuel mixture supplied from the steam reforming reactor 32 by use of a catalyst as in the chemical formula (3).

$$CO + H_2O \rightarrow CO_2 + H_2 \tag{3}$$

The steam which has not reacted in the steam reforming reactor 32 is used for the aqueous shift reaction, and the concentrations of the steam and carbon monoxide gas of the mixture become significantly low. The mixing gas (including hydrogen gas, carbon dioxide gas, carbon monoxide gas etc.) is supplied from the aqueous shift reactor 33 to the selective oxidation reactor 34.

Water on the left sides of the above-mentioned chemical formula (1) and chemical formula (2) has previously been contained in the fuel 9 sealed in a bottle 39 of the fuel container 2, but the water which is contained in the fuel 9 and has not reacted in the chemical formula (2) may be used for water on the left side of the chemical formula (3). Alternatively, water produced by the fuel cell 4 described later may be introduced into the aqueous shift reactor 33 via a water introduction pipe 38 controlled by a valve 36, or water accumulated in the fuel container 2 isolated from the bottle 39 can be introduced from the pipe 37 to the water introduction pipe 38 by use of the capillary phenomenon to obtain water.

It is to be noted that the water produced in the fuel cell 4 may be introduced as water on the left side of the chemical formula (2) to the steam reforming reactor 32 via the water introduction pipe 38 controlled by the valve 36 in order to increase the concentration of the chemical fuel contained in the fuel 9, or water accumulated in the fuel container 2 isolated from the bottle 39 can be introduced from the pipe 37 to the water introduction pipe 38 by use of the capillary phenomenon to obtain water.

The selective oxidation reactor 34 is a reaction furnace where the mixing gas or air-fuel mixture (hydrogen gas, carbon dioxide gas, steam and carbon monoxide gas) supplied from the aqueous shift reactor 33 is heat-treated. Therefore, the heat generating section 80 heats the inside of the selective oxidation reactor 34 to 160° C. to 200° C. such that the selective oxidation reactor 34 selects, by use of a catalyst, carbon monoxide gas out of the mixture supplied from the aqueous shift reactor 33, thereby oxidizing carbon monoxide gas as in the chemical formula (4).

$$2CO + O_2 \rightarrow 2CO_2 \tag{4}$$

Oxygen on the left side of the chemical formula (4) is taken from the atmosphere into the selective oxidation reactor 34 via air holes 35 of the power generation module 5. Further, as the catalyst is formed in the selective oxidation reactor 34 to selectively promote the chemical reaction of the chemical formula (4), hydrogen contained in the air-fuel mixture is hardly oxidized. The air-fuel mixture is supplied from the selective oxidation reactor 34 to the fuel cell 4, but the air-fuel mixture hardly contains carbon monoxide gas, and the purity of hydrogen gas and carbon dioxide gas is very high. If a system is provided in the selective oxidation reactor 34 which is capable of separating hydrogen from other harmless by-products, the by-products may be discharged from the air hole 35.

The fuel cell 4 is provided on a peripheral surface side of the power generation module 5. The fuel cell 4 comprises a fuel electrode (cathode) to which catalytic fine particles are stuck, an air electrode (anode) to which catalytic fine particles are stuck, and a film-like ion conductive film placed between the fuel electrode and the air electrode. The air-fuel mixture from the selective oxidation reactor 34 is supplied to the fuel electrode, while oxygen gas in the atmosphere is supplied to the air electrode via slits 13 provided in an outer periphery of the power generation module 5.

When hydrogen gas is supplied to the fuel electrode as shown in an electrochemical formula (5), hydrogen ions in which electrons are separated are produced by the catalyst sticking to the fuel electrode, and hydrogen ions conduct to the air electrode through the ion conductive film, and then electrons are taken out by the fuel electrode. It is to be noted that carbon dioxide gas in the air-fuel mixture supplied from the selective oxidation reactor 34 is discharged to the outside without any reaction.

$$3H_2 \rightarrow 6H^+ + 6e^- \tag{5}$$

As shown in an electrochemical formula (6), when oxygen gas is supplied to the air electrode, hydrogen ions which have passed through the ion conductive film, oxygen gas and electrons cause a reaction to produce water.

$$6H^+ + 3/2O_2 + 6e^- \rightarrow 3H_2O \tag{6}$$

The electrochemical reaction as described above occurs in the fuel cell 4 to generate electric energy.

Next, the heat generating section 80 will be described in detail.

The heat generating section 80 has a heat generating resistive film 47 (heat generating resistive element, (refer to FIG. 4)) which is a heating element to generate heat when a predetermined voltage is applied and which also functions as a temperature sensor utilizing changes in a resistance ratio with temperature changes. The power supply section 60 serves to apply a voltage to the heat generating resistive film 47 to cause it to generate heat. A control section 70 reads a value of this voltage and a value of a current flowing through the heat generating resistive film 47 to calculate a resistance value of the heat generating resistive film 47, and derives the temperature of the heat generating resistive film 47 from the resistance value.

The control section 70 controls the temperatures of the heat generating resistive films 47 on the basis of the calculated temperatures of the heat generating resistive films 47, and thus controls the temperatures of the vaporizer 31, the steam reforming reactor 32, the aqueous shift reactor 33 and the selective oxidation reactor 34 each of which is heated by propagation of heat from the heat generating resistive film 47.

More specifically, when the temperatures of the heat generating resistive films 47, and thus the temperatures of the vaporizer 31, the steam reforming reactor 32, the aqueous shift reactor 33 and the selective oxidation reactor 34 are lower than predetermined ranges, a command signal from the control section 70 causes the power supply section 60 to apply a high voltage to the heat generating resistive films 47 to increase the temperature. Contrarily, when the temperatures of the heat generating resistive films 47, and thus the temperatures of the various members 31, 32, 33 and 34 are higher than the predetermined ranges, a command signal from the control section 70 causes the power supply section 60 to apply a low voltage to the heat generating resistive films 47 or stop the application of the voltage in order to decrease the temperature. Thereby, the vaporizer 31, the steam reforming reactor 32, the aqueous shift reactor 33 and the selective oxidation reactor 34 are set within the temperature ranges suitable for the respective reactions.

Figure 3:
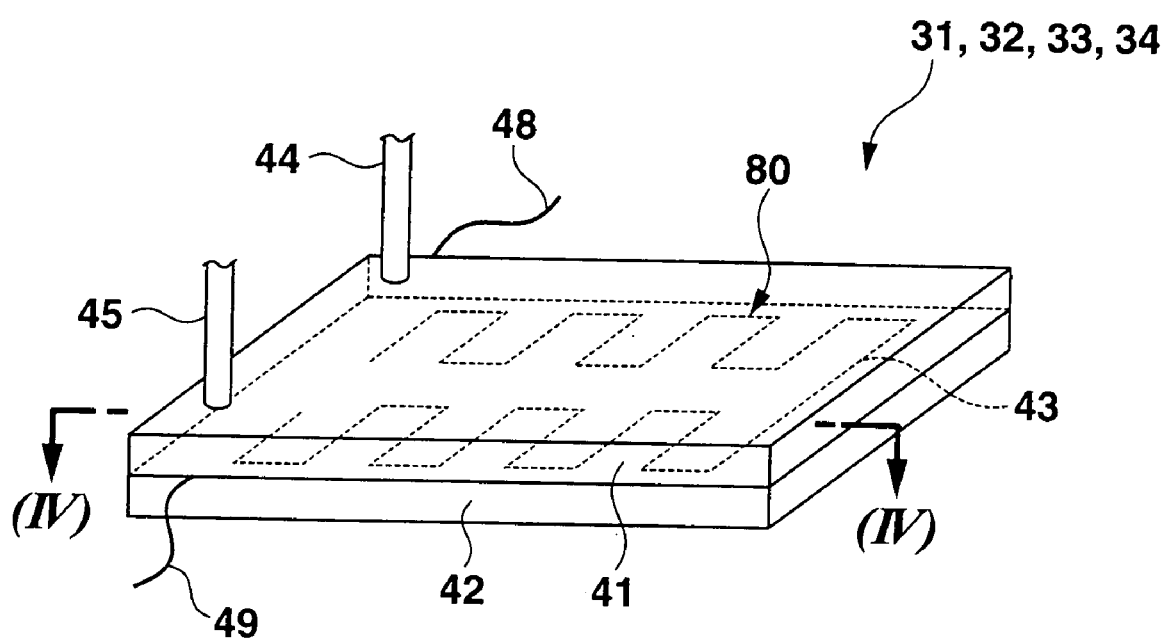
FIG. 3 is a perspective view showing a vaporizer, a steam reforming reactor, an aqueous shift reactor and a selective oxidation reactor that are provided in the power generation system.
Figure 4:
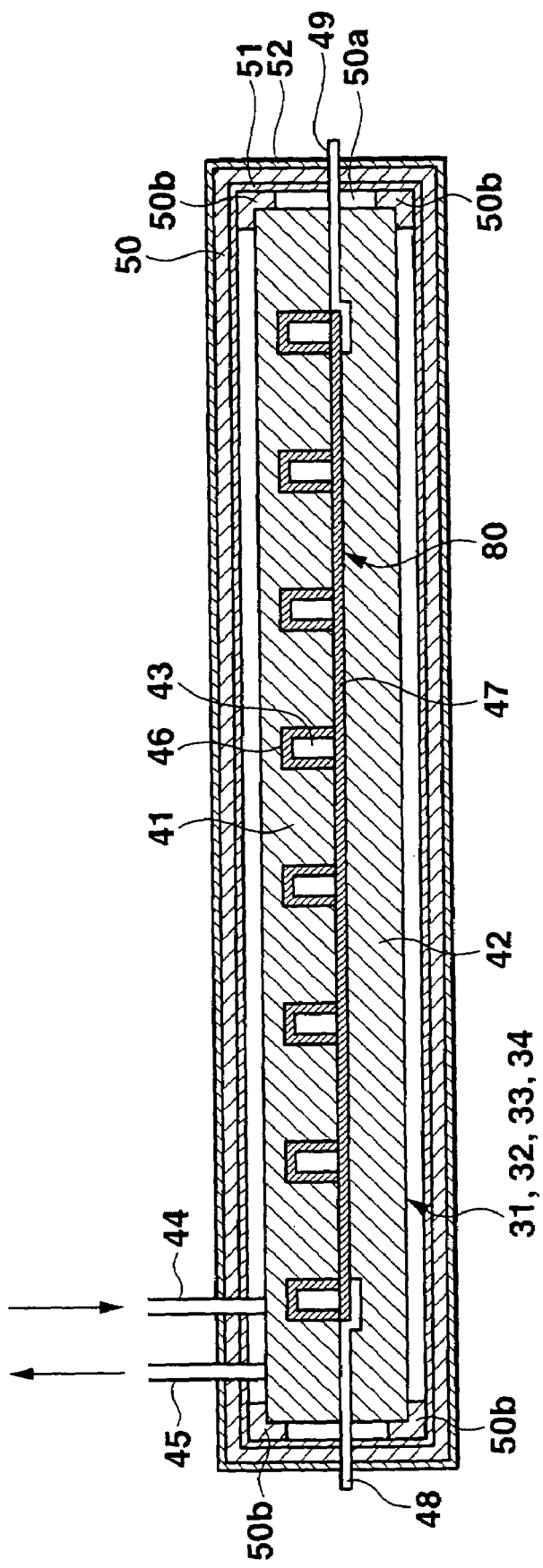
FIG. 4 is a sectional view showing the vaporizer, the steam reforming reactor, the aqueous shift reactor and the selective oxidation reactor.

FIG. 3 is a perspective view showing each of the vaporizer 31, the steam reforming reactor 32, the aqueous shift reactor 33 and the selective oxidation reactor 34, and FIG. 4 is a sectional view broken in an arrow direction along the line (IV)-(IV) of FIG. 3. As shown in FIG. 3 and FIG. 4, each of the vaporizer 31, the steam reforming reactor 32, the aqueous shift reactor 33 and the selective oxidation reactor 34 structure in which two substrates 41, 42 are superimposed and bonded together, and a zigzag micro flow path 43 (flow path) is formed in a bonded surface of the substrate 41 (or 42). The micro flow path 43 is formed in such a manner that the substrate 41 such as a glass or silicon substrate in one surface of which a zigzag groove is formed is affixed and bonded to the substrate 42 such as a glass or silicon substrate. The groove is formed by properly applying a photolithography method, an etching method and the like to one surface of the substrate 41. The substrate 41 has a suitable size, by way of example, a length of about 15 to 35 mm, a width of about 10 to 25 mm and a thickness of about 0.4 to 1 mm, and the dimensions of the zigzag groove provided in one surface of the substrate 41 have, by way of example, a width of about 0.05 to 0.8 mm, a depth of about 0.05 to 0.6 mm and an entire length of about 10 to 1000 mm.

An end of a supply pipe 44 is coupled to one end of the micro flow path 43 of each of the devices 31 to 34, and an end of a discharge pipe 45 is coupled to the other end of the micro flow path 43. Here, the supply pipe 44 of the vaporizer 31 is in communication with the fuel container 2, and the discharge pipe 45 of the vaporizer 31 is in communication with the supply pipe 44 of the steam reforming reactor 32. Moreover, the discharge pipe 45 of the steam reforming reactor 32 is in communication with the supply pipe 44 of the aqueous shift reactor 33. The discharge pipe 45 of the aqueous shift reactor 33 is in communication with the supply pipe 44 of the selective oxidation reactor 34. The discharge pipe 45 of the selective oxidation reactor 34 is in communication with the fuel electrode of the fuel cell 4.

A reforming catalytic film 46 is formed on an inner wall side walls and a ceiling of the micro flow path 43 from the inlet side or one end to the outlet side or other end of the micro flow path 43 along the entire micro flow path 43, and the heat generating resistive film 47 is formed on a floor (surfaces of the substrates 41, 42) of the micro flow path 43 from one end to the other end of the micro flow path 43 along the micro flow path 43. The reforming catalytic film 46 reforms the chemical fuel to promote the production of hydrogen. Here, for the steam reforming reactor 32, the chemical reaction shown in the above chemical formula (1) is promoted by the catalytic film 46, and for the aqueous shift reactor 33, the chemical reaction shown in the above chemical formula (3) is promoted by the catalytic film 46, and for the selective oxidation reactor 34, the chemical reaction shown in the above chemical formula (4) is promoted by the catalytic film 46. The components, kind and the like of the reforming catalytic film 46 may differ or the same among the steam reforming reactor 32, the aqueous shift reactor 33 and the selective oxidation reactor 34. In addition, for the vaporizer 31, the reforming catalytic film 46 may not be formed.

Figure 5:
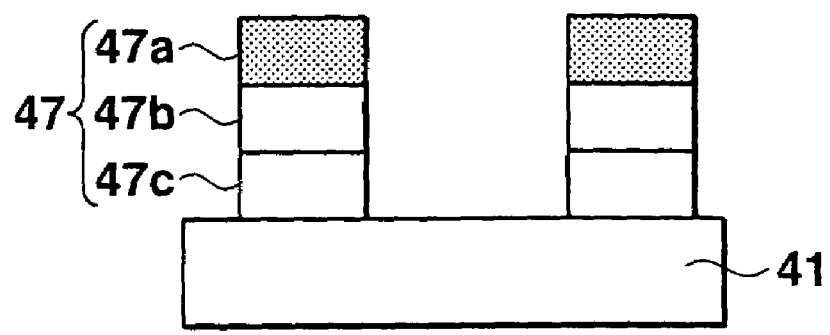
FIG. 5 is a sectional view showing a configuration of a heat generating resistive film.

FIG. 5 is a longitudinal sectional view showing a schematic configuration of the heat generating resistive film 47.

The heat generating resistive film 47 has a laminate structure of a heat generating layer 47a, a diffusion preventing layer 47b to prevent a diffusion phenomenon due to heat generation of the heat generating layer 47a, and a cohering layer 47c to enhance cohesion strength between the diffusion preventing layer 47b and the surface of the substrate 41.

The respective heat generating layer 47a is made of a material whose resistivity changes significantly with the temperature changes, and due to the lowest resistivity among the cohering layer 47c, the diffusion preventing layer 47b and the heat generating layer 47a, generates heat when a current is passed therethrough by the application of a voltage to the heat generating resistive film 47.

The respective heat generating layers 47a properly heat the vaporizer 31, the steam reforming reactor 32, the aqueous shift reactor 33 and the selective oxidation reactor 34 so that they cause reactions as required, and also serve as temperature sensors to read the temperature changes from their resistance changes. The heating of the heat generating resistive films 47 is adjusted in accordance with temperature information obtained by the temperature sensors so that the vaporizer 31, the steam reforming reactor 32, the aqueous shift reactor 33 and the selective oxidation reactor 34 are within the predetermined temperature ranges. The diffusion preventing layers 47b are made of a material which can maintain a close bonding state even at a high temperature so that the heat generating layers 47a do not cause a thermal diffusion within the temperature ranges at which the chemical reactions are caused in the vaporizer 31, the steam reforming reactor 32, the aqueous shift reactor 33 and the selective oxidation reactor 34. The cohering layer 47c coheres better to the substrate 41 than to the diffusion preventing layer 47b, and is present between the substrate 41 and the diffusion preventing layer 47b to serve to prevent the heat generating resistive films 47 from separating from the substrate 41.

Figure 6:
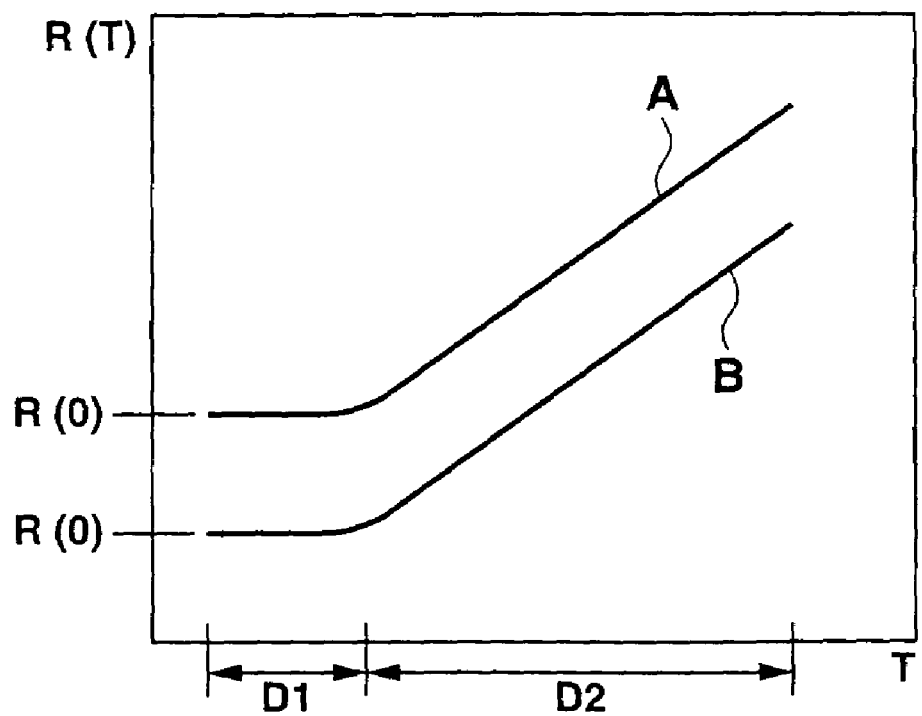
FIG. 6 is a graph showing the relation between electric resistance and a temperature change.

FIG. 6 is a graph showing the relation between the electric resistance and temperature change of general metals A, B. A horizontal axis of the figure represents the temperature of the metals, and a vertical axis represents electric resistances R(T) of the metals at a temperature of T° C.

In the general metals, there are an area D1 where the electric resistance does not change with the temperature change (including 0° C.) due to, for example, impurities and lattice defects in the metals, and an area D2 where the electric resistance changes linear-functionally with the temperature due to thermal vibration or the like of atoms in the metals. In the following explanation, the electric resistance at 0° C. in the area D1 is referred to as a residual resistance R(0).

In the area D1, R(0) and R(T) have substantially equal values, and in the area D2, $$R(T)=R(0)+\alpha T \tag{7}$$

is established. Where, $\alpha$ is a change rate of the electric resistance due to the temperature change, and is a value intrinsic to each metal.

Thus, the residual resistance R(0) of the metals and the change rate $\alpha$ of the electric resistance due to the temperature change have been obtained in advance, and the R(T) is measured by a temperature measurement section in the area D2, thereby enabling the temperature T of the micro flow path to be calculated.

Here, gold (Au) is preferably used as a main substance to constitute the heat generating layer 47a. Since Au is characterized by the high change rate $\alpha$ of the electric resistance due to the temperature change, it can reduce measurement errors of the temperature T.

The main substance to constitute the diffusion preventing layer 47b is preferably a substance which prevents part of the substances constituting the heat generating layer 47a from thermally diffusing into the diffusion preventing layer 47b and which is stiff and has a relatively high melting point such that the main substance in the diffusion preventing layer 47b does not thermally diffuse into the heat generating layer 47a and the cohering layer 47c. It is also preferably a substance which has low reactivity such that it is not oxidized by being heated. Substances that satisfy such requirements include tungsten (W), for example. Here, the diffusion preventing layer 47b made of W does not cohere well to the substrate 41 having an oxide such as glass, so that the cohering layer 47c is preferably provided between the diffusion preventing layer 47b and the substrate 41.

Figure 7:
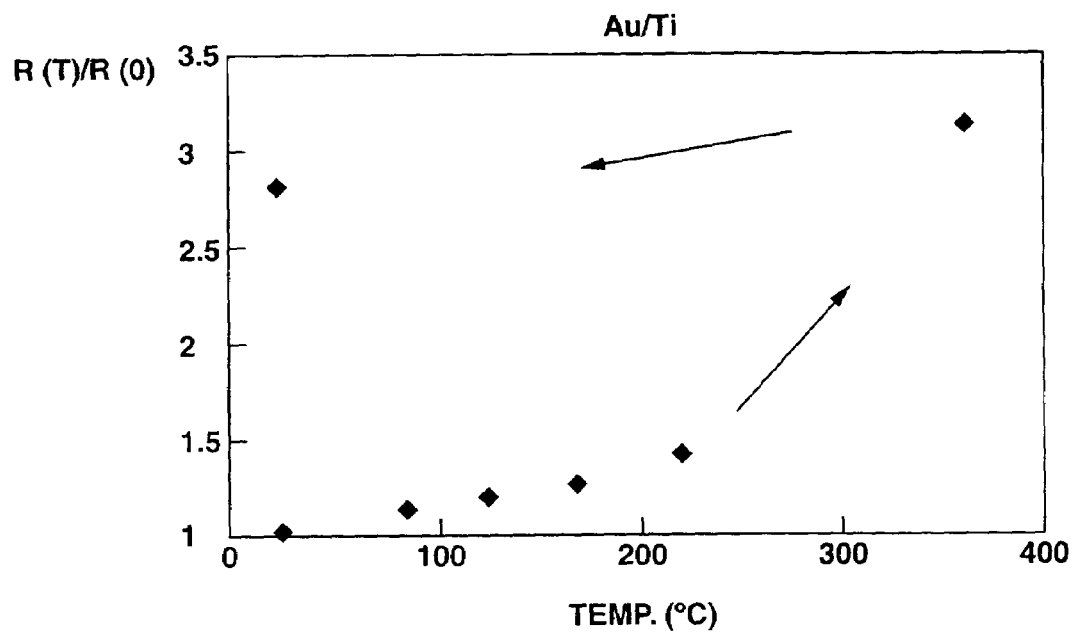
FIG. 7 is a graph showing the relation between the electric resistance and the temperature change.
Figure 8:
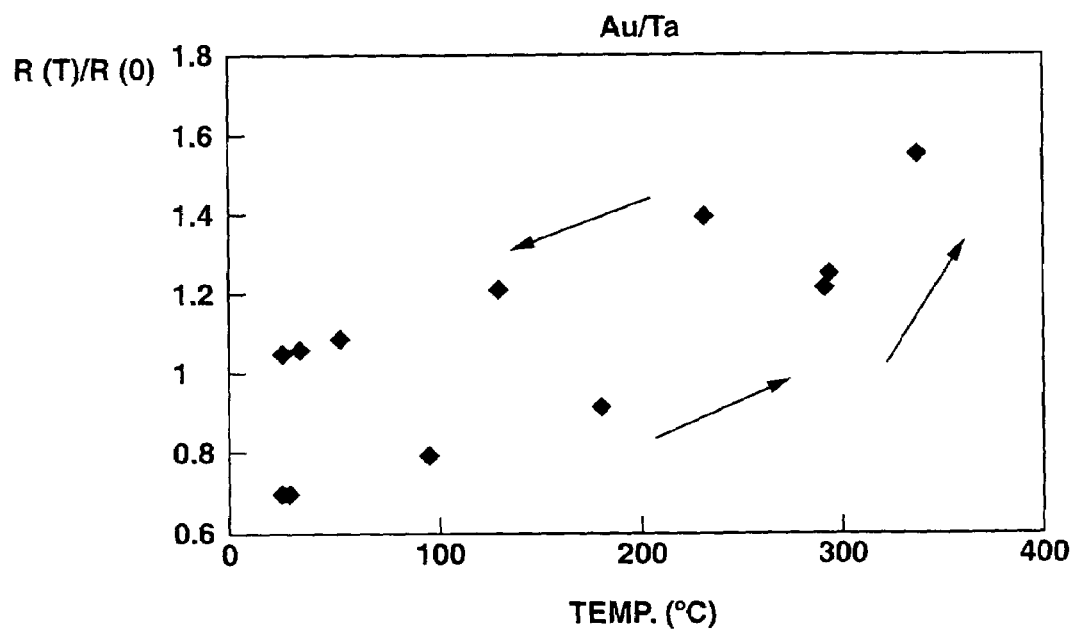
FIG. 8 is a graph showing the relation between the electric resistance and the temperature change.
Figure 9:
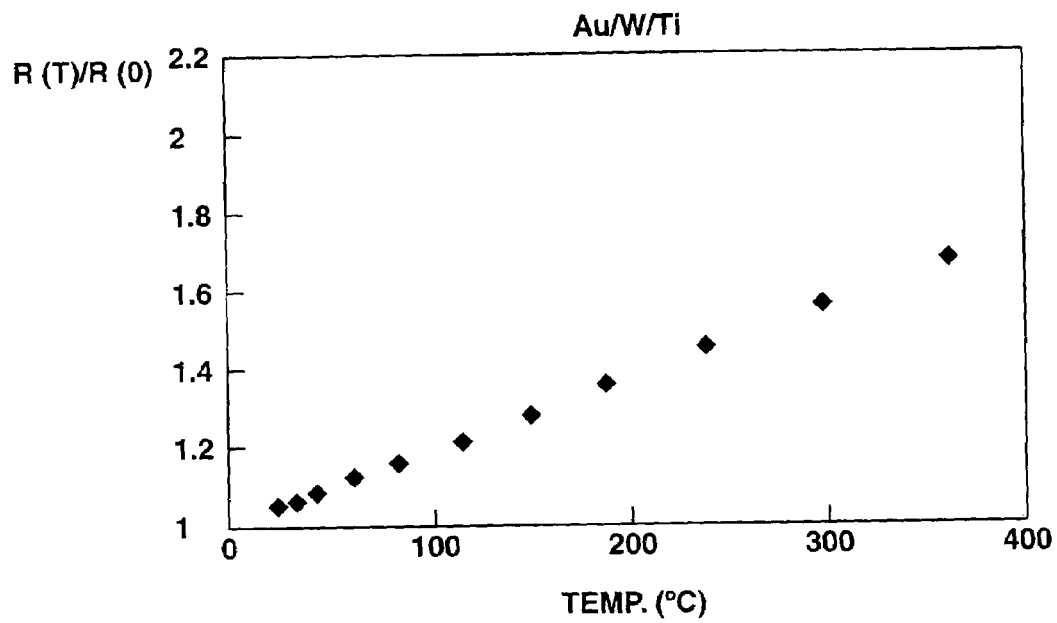
FIG. 9 is a graph showing the relation between the electric resistance and the temperature change.

FIG. 7 is a graph when the diffusion preventing layer 47b made of Ti having a thickness of 50 nm is formed on the surface of the substrate 41 and the heat generating layer 47a made of Au having a thickness of 200 nm is formed thereon, as a first comparative example. FIG. 8 is a graph when the diffusion preventing layer 47b made of Ta having a thickness of 100 nm is formed the substrate 41 and the heat generating layer 47a made of Au having a thickness of 200 nm is formed thereon, as a second comparative example. FIG. 9 is a graph when the base layer 47c made of Ti having a thickness of 50 nm is formed on the surface of the substrate, and the diffusion preventing layer 47b made of W having a thickness of 50 nm is formed thereon, and then the heat generating layer 47a made of Au having a thickness of 200 nm is formed thereon, as an example of the present invention. Horizontal axes of FIGS. 7 to 9 represent the temperature, and vertical axes represent a resistance ratio R(T)/R(0) in which the electric resistance R(T) in the area D2 is subtracted by the residual resistance R(0).

In FIGS. 7 and 8, as indicated by arrows, when the temperature is increased from the room temperature and again brought to the room temperature, such a phenomenon is seen that the electric resistances R(T) sharply increases in a region where the temperature T is beyond 250° C., which proves that the above equation (7) is not established. This is supposedly due to the diffusion phenomenon in which atoms in Ti and Ta used as the diffusion preventing layer 47b move to the side of the heat generating layer 47a through heat energy and atoms in the heat generating layer 47a move to the diffusion preventing layer 47b. Thus, the compositions of the respective layers of the heat generating resistive film 47 change, so that it is difficult to measure an exact temperature from the resistance of the heat generating resistive film 47 because the resistance ratio R(T)/R(0) does not regain an original value and is not reproducible even if the temperature is returned to the room temperature again. Contrarily, even if a voltage of a predetermined value is applied, it is not possible to heat again to the accurate temperature because the heating temperature varies every time the voltage is applied.

On the other hand, FIG. 9 shows no rapid change in the electric resistance R(T), proving that the above equation (7) is almost established. Further, the resistance ratio R(T)/R(0) returns to the original value even when the temperature is increased from the room temperature and again brought to the room temperature, so that the exact temperature of the heat generating resistive film 47 can always be derived from the resistance value which has been calculated by reading the voltage and current applied to the heat generating resistive film 47, and the heat generating resistive film 47 therefore also functions as the temperature sensor.

Given that W has the highest melting point among the above-mentioned substances and that the melting point becomes lower in the order of Ta, Mo, Ti and Cr, it can be surmised that the phenomenon in which the electric resistance R(T) increases rapidly beyond a particular temperature can be seen as shown in FIGS. 7 and 8 even when Mo or Cr is used as the diffusion preventing layer 47b.

This shows that the use of W as the substance of the diffusion preventing layer 47b is most effective in reducing the diffusion phenomenon.

At least one of Ta, Mo, Ti, Cr and TiN is preferably contained as the main substance constituting the cohering layer 47c. Considering that W as the main substance of the diffusion preventing layer 47b might detach due to low cohesion properties to an oxide film used for the substrate 41, at least one of Ta, Mo, Ti and Cr is used for the substance constituting the cohering layer 47c as a material which coheres well to the oxide such as the substrate 41 and which coheres well to the metal such as W.

As the heat generating layer 47a needs to have a resistance suitable for being heated to a predetermined temperature, its thickness is preferably within 100 nm to 700 nm.

Figure 10:
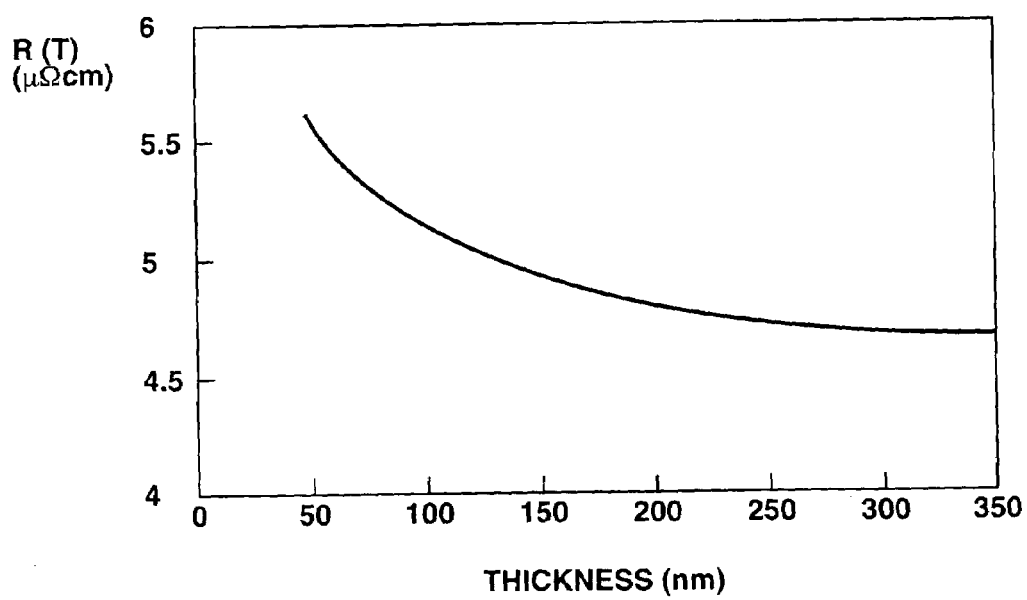
FIG. 10 is a graph showing the relation between the electric resistance and the thickness of a layer.

FIG. 10 is a graph showing a relation between the electric resistance R(T) and the thickness of the heat generating layer 47a when Au is used for the heat generating layer 47a under a constant temperature condition.

When the thickness of the heat generating layer 47a is 50 nm, the electric resistance R(T) is 5.7 µΩcm, and when the thickness is 100 nm, the electric resistance R(T) is 5.2 µΩcm, and when the thickness is 300 nm, the electric resistance R(T) is 4.7 µΩcm, and when the thickness is beyond 300 nm, the electric resistance R(T) has a substantially constant value.

Here, as the value of the electric resistance R(T) becomes lower, the change rate of the electric resistance R(T) becomes higher when the electric resistance R(T) changes in unit quantity (1.0 µΩcm) For example, the change rate will be 11/10=1.1 when the electric resistance R(T) changes by 1 µΩcm from 10 µΩcm to 11 µΩcm, but the change rate will be 4/3=1.33 when the electric resistance R(T) changes by 1 µΩcm from 3 µΩcm to 4 µΩcm.

Therefore, the change in the electric resistance R(T) can be more easily detected if a material is used which has as low electric resistance R(T) as possible and which has as much displacement as possible in the electric resistance R(T) due to the change in the temperature T, in which case the measurement accuracy of the temperature T can be enhanced.

An experimental result has revealed that when the thickness of the layer is smaller than 100 nm, the electric resistance R(T) is too high and the measurement accuracy of the temperature T is low. It has also been found out that when the thickness of the layer is beyond 700 nm, the cohesion strength between the heat generating layer 47a and the diffusion preventing layer 47b can not be sufficiently ensured, and that troubles such as cracking might be caused to the heat generating layer 47a. Thus, the thickness of the heat generating layer 47a is preferably within a range of 100 nm to 700 nm.

Figure 11:
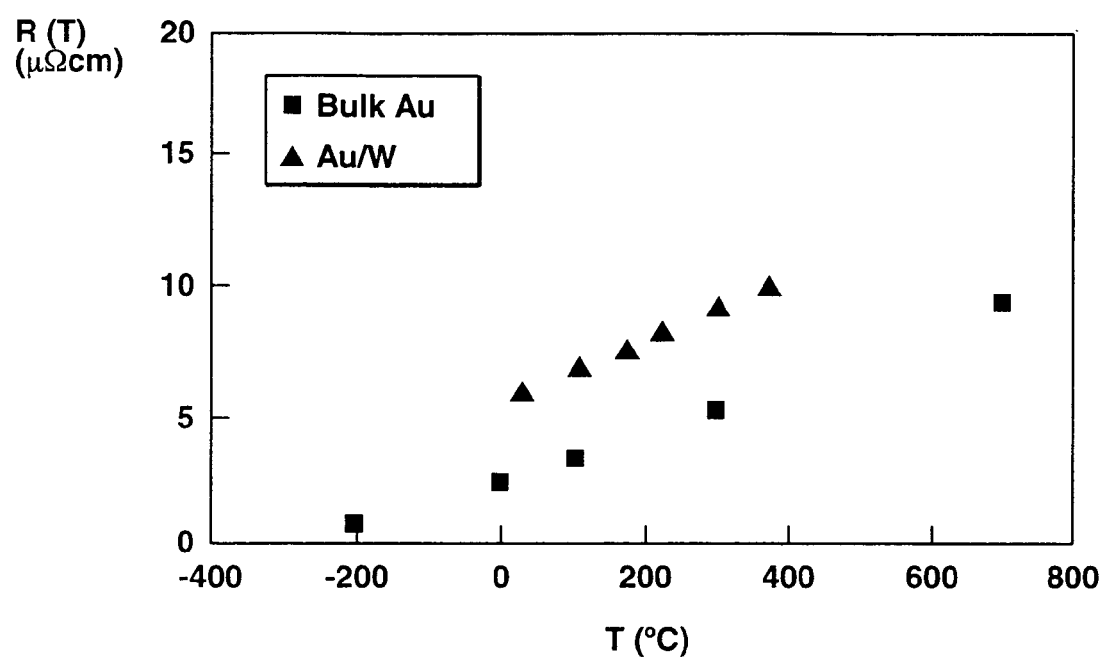
FIG. 11 is a graph showing the relation between the electric resistance and the temperature change.

FIG. 11 is a graph showing the temperature dependency of the electric resistance R(T) in a lump (Bulk Au) of pure gold and the temperature dependency of the electric resistance R(T) in the heat generating resistive film 47 which is constituted of the heat generating layer 47a made of Au having a thickness of 100 nm and a diffusion preventing film 47b made of W.

FIG. 11 shows that both do not have a great difference in the change rate of the electric resistance R(T) due to the temperature change, and that the change rate is linear with sufficient degree of inclination, so that with the thickness of the heat generating layer 47a in a range of 100 nm to 700 nm as described above, the heat generating resistive film 47 can be obtained which is accurate enough in practice.

The thickness of the diffusion preventing layer 47b is preferably in a range of 50 nm to 100 nm. This is because when the thickness of the layer is below 50 nm, it is difficult to form each layer by a gas phase method such as a vacuum deposition method, sputtering method or CVD method, and even when the thickness of the layer is beyond 100 nm, there is not a notable change in diffusion preventing properties. Moreover, 50 nm to 100 nm is sufficient for the thickness of the cohering layer 47c because thickness of more than 100 nm does not have an effect on the cohesion properties.

In order to provide electric power to the heat generating resistive film 47 having characteristics as mentioned above, a lead wire 48 is connected to the heat generating resistive film 47 at one end of the micro flow path 43, and a lead wire 49 is connected to the heat generating resistive film 47 at the other end of the micro flow path 43, as shown in FIG. 4. The lead wires 48, 49 are led to the outside of the vaporizer 31, the steam reforming reactor 32, the aqueous shift reactor 33 and the selective oxidation reactor 34. The lead wires 48, 49 preferably have the electric resistance which is very low to a negligible degree as compared with the heat generating resistive film 47.

Each of the vaporizer 31, the steam reforming reactor 32, the aqueous shift reactor 33 and the selective oxidation reactor 34 is respectively housed in an inner space 50a of the box 50 with the support of corner supports 50b. A radiation shielding film 51 is formed on an inner surface of the box 50, and is highly reflective to electromagnetic waves. A radiation shielding film 52 is also formed on an outer surface of the box 50. As both radiation shielding films 51 and 52 are formed on the box 50, the electromagnetic waves caused by each of the vaporizer 31, the steam reforming reactor 32, the aqueous shift reactor 33 and the selective oxidation reactor 34 hardly propagate to the outside of the box 50 and are reflected to each of the devices 31, 32, 33 and 34, thereby reducing heat radiation.

In FIG. 4, air pressure is very low in the space 50a of the box 50, in a vacuum of 1 space or lower. Since the space 50a is 1 Torr or lower inside, there are a few media which propagate heat into the space 50a, such that heat is prevented from being released from the vaporizer 31, the steam reforming reactor 32, the aqueous shift reactor 33 and the selective oxidation reactor 34 to the outside of the boxes 50. Further, as there are a few heat media in the space 50a, convection of the heat media is not caused very much in the space 50a, such that the heat is prevented from being transmitted from the vaporizer 31, the steam reforming reactor 32, the aqueous shift reactor 33 and the selective oxidation reactor 34 to the outside.

The lead wires 48, 49 led out from each of the vaporizer 31, the steam reforming reactor 32, the aqueous shift reactor 33 and the selective oxidation reactor 34 penetrate the box 50, and are led to the outside of the box 50. Furthermore, the pipes 44 and 45 also penetrate the box 50 and are led to the outside of the boxes 50. In FIG. 4, each of the vaporizer 31, the steam reforming reactor 32, the aqueous shift reactor 33 and the selective oxidation reactor 34 is supported by the supports 50b, and is separated from the inner surface of the box 50. As the inner wall of the box 50 is spaced from each of the vaporizer 31, the steam reforming reactor 32, the aqueous shift reactor 33 and the selective oxidation reactor 34, heat is prevented from being conducted from each of devices 31, 32, 33 and 34 to the housing 50.

Figure 12:
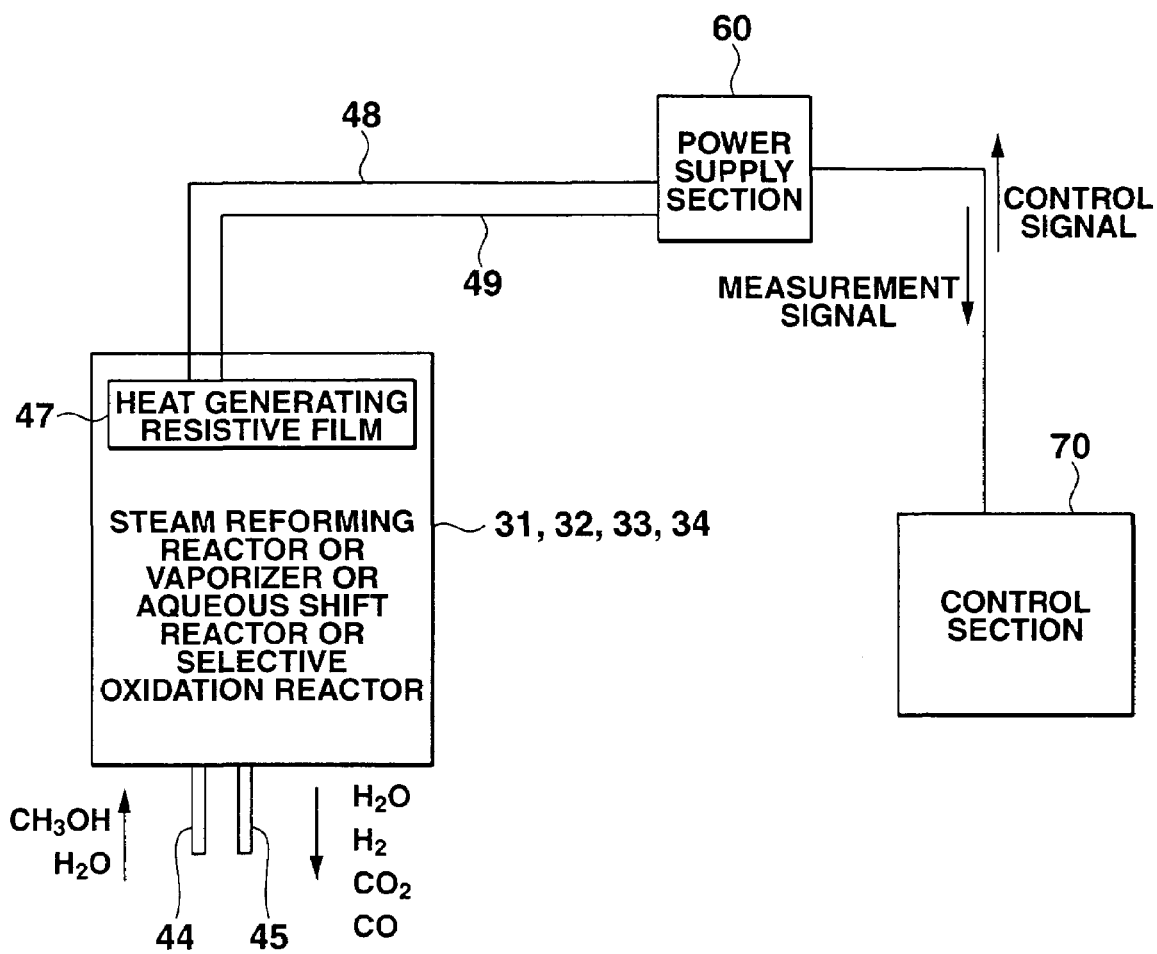
FIG. 12 is a block diagram showing the heat generating section in the present embodiment.

Next, an electric system to drive the vaporizer 31, the steam reforming reactor 32, the aqueous shift reactor 33 and the selective oxidation reactor 34 will be described referring to FIG. 12.

The direct current power supply section 60 is provided outside the box 50, and the lead wires 48, 49 are connected to terminals of the power supply section 60, so that the power supply section 60 supplies electric power to the heat generating resistive film 47 through the lead wires 48, 49.

The power supply section 60 has a function to be able to change the electric power supplied to the heat generating resistive film 47 in accordance with a control signal from the control section 70. For example, if the voltage applied by the power supply section 60 is constant, the power supply section 60 can change the current to be passed through the lead wires 48, 49, and if the current passed by the power supply section 60 is constant, the power supply section 60 can change the voltage to be applied to the lead wires 48, 49.

Alternatively, the power supply section 60 may be able to change both the voltage and current.

If the voltage applied to the heat generating resistive film 47 by the power supply section 60 is constant, the power supply section 60 measures the current passed through the heat generating resistive film 47, and if the current passed by the power supply section 60 is constant, the power supply section 60 measures the voltage applied to the heat generating resistive film 47. Naturally, the power supply section 60 may measure the current together with the voltage to obtain the resistance value of the heat generating resistive film 47.

When the voltage applied from the power supply section 60 to the heat generating resistive film 47 and the current passing through the heat generating resistive film 47 are measured, the electric resistance of the heat generating resistive film 47 can be detected in the power supply section 60. Because the electric resistance of the heat generating resistive film 47 is dependent upon the temperature, the temperature of the heat generating resistive film 47 can be calculated from the voltage and current measured by the power supply section 60, thus allowing the temperature of the micro flow path 43 to be calculated.

The electric power of the power supply section 60 is controlled by the control section 70, but if the current passed by the power supply section 60 is constant, the control section 70 only controls the voltage of the power supply section 60, and if the voltage applied by the power supply section 60 is constant, the control section 70 only controls the current of the power supply section 60 to measure the resistance.

The electric resistance detected in the power supply section 60 is fed back to the control section 70, but if the current passed by the power supply section 60 is constant, the measured voltage alone may be fed back to the control section 70, and if the voltage applied by the power supply section 60 is constant, the measured current alone may be fed back to the control section 70. When the voltage alone is fed back, the level of the constant current of the power supply section 60 is stored in the control section 70, and when the current alone is fed back, the level of the constant voltage of the power supply section 60 is stored in the control section 70. Thus, the electric resistance of the heat generating resistive film 47 is recognized in the control section 70, and consequently, the temperature of the heat generating resistive film 47 is recognized. As described above, the combination of the power supply section 60 and the control section 70 configure the temperature measurement section according to the present invention.

The control section 70 basically adjusts the electric power of the power supply section 60 on the basis of signals representing the current and voltage measured by the power supply section 60, but has an arithmetic processing unit comprising a multi-purpose CPU (central processing unit) or a dedicated logic circuit, and processes the signals from the power supply section 60 to control the power supply section 60. Moreover, the control section 70 is capable of processing to calculate the electric resistance of the heat generating resistive film 47 by Ohm's law from the fed-back current and voltage, and of processing to calculate the temperature of the heat generating resistive film 47 from the electric resistance of the heat generating resistive film 47. If the heat generating resistive film 47 and the micro flow path 43 are thermally balanced, the temperature of the heat generating resistive film 47 is equal to the temperature in the micro flow path 43.

Next, one example of the operation of the power generation system 1 will be described.

First, when a control signal to drive the reforming means 3 is input from the control section 70 to the power supply section 60, the electric power for heating is supplied from the power supply section 60 via the respective lead wires 48, 49 to the heat generating resistive film 47 of the vaporizer 31, the heat generating resistive film 47 of the steam reforming reactor 32, the heat generating resistive film 47 of the aqueous shift reactor 33 and the heat generating resistive film 47 of the selective oxidation reactor 34, respectively, and each of the heat generating resistive film 47 generates heat to reach the predetermined temperature. In the power supply section 60, the voltages applied to all the heat generating resistive films 47 and the current flowing through the heat generating resistive films 47 are always measured (however, the current alone may be measured if the power supply section 60 has the constant voltage, and the voltage alone may be measured if the power supply section 60 has the constant current.), and the signals representing the measured voltage and current are always input from the power supply section 60 to the control section 70.

At this point, the fuel 9 is supplied from the fuel container 2 to the vaporizer 31, and the fuel 9 evaporates in the vaporizer 31, and then the air pressure in the vaporizer 31 increases to cause convection. Therefore, the air-fuel mixture of methanol and water naturally flows from the vaporizer 31 to the steam reforming reactor 32, the aqueous shift reactor 33, the selective oxidation reactor 34 and the fuel cell 4 in order.

In the steam reforming reactor 32, the air-fuel mixture flows through the micro flow path 43 from the supply pipe 44 to the discharge pipe 45. While the air-fuel mixture is flowing through the micro flow path 43, the air-fuel mixture is heated by the heat generating resistive film 47. The air-fuel mixture is then prompted by the reforming catalytic film 46 to cause the reactions as in the above chemical formulas (1) and (2). As the above chemical formula (1) represents an endothermal reaction, the air-fuel mixture is heated by the heat generating resistive film 47 to achieve a very high reaction rate.

In the aqueous shift reactor 33, the air-fuel mixture is heated by the heat generating resistive film 47 to cause the reaction as in the above chemical formula (3), and similarly in the selective oxidation reactor 34, the air-fuel mixture is heated by the heat generating resistive film 47 to cause the reaction as in the above chemical formula (4). Thus, an electrochemical reaction is caused in the fuel cell 4 to which hydrogen reformed into and obtained by the reforming means 3 has been supplied, thereby generating electric energy.

The power supply section 60 individually performs temperature control for the vaporizer 31, the steam reforming reactor 32, the aqueous shift reactor 33 and the selective oxidation reactor 34.

In particular, since the signals representing the voltage and current of the heat generating resistive film 47 are input from the power supply section 60 to the control section 70 as required in all of the vaporizer 31, the steam reforming reactor 32, the aqueous shift reactor 33 and the selective oxidation reactor 34, the electric resistance of the heat generating resistive films 47 of the vaporizer 31, the steam reforming reactor 32, the aqueous shift reactor 33 and the selective oxidation reactor 34 is calculated in the control section 70, with the result that the temperature of each of the heat generating resistive films 47 is recognized in the control section 70. That is, information including the resistance of the heat generating resistive film 47 of the vaporizer 31 is communicated to the power supply section 60 via the lead wires 48, 49 and input as a measurement signal to the control section 70. Information including the resistance of the heat generating resistive film 47 of the steam reforming reactor 32 is communicated to the power supply section 60 via the lead wires 48, 49 and input as a measurement signal to the control section 70. Information including the resistance of the heat generating resistive film 47 of the aqueous shift reactor 33 is communicated to the power supply section 60 via the lead wires 48, 49 and input as a measurement signal to the control section 70. Information including the resistance of the heat generating resistive film 47 of the selective oxidation reactor 34 is communicated to the power supply section 60 via the lead wires 48, 49 and input as a measurement signal to the control section 70. The measurement signal is thus properly fed back so that the vaporizer 31, the steam reforming reactor 32, the aqueous shift reactor 33 and the selective oxidation reactor 34 are respectively stabilized at the predetermined temperatures.

Furthermore, the control section 70 performs processing to adjust the temperature of the heat generating resistive films 47. For example, if the temperature of the heat generating resistive film 47 is higher than an upper threshold value temperature, the control section 70 controls the power supply section 60 so that the electric power supplied from the power supply section 60 to the heat generating resistive film 47 is lower than current electric power, and if the temperature of the heat generating resistive film 47 is lower than a lower threshold value temperature (but, higher than the upper threshold value temperature), the control section 70 controls the power supply section 60 so that the electric power supplied from the power supply section 60 to the heat generating resistive film 47 is higher than the current electric power. The electric power supplied from the power supply section 60 to the heat generating resistive film 47 is adjusted by the control section 70, such that the temperature of the heat generating resistive film 47 is maintained between the lower threshold value temperature and the upper threshold value temperature. The control section 70 performs such control individually for the vaporizer 31, the steam reforming reactor 32, the aqueous shift reactor 33 and the selective oxidation reactor 34. That is, for the steam reforming reactor 32, the upper threshold value temperature and the lower threshold value temperature are set in the control section 70 so that the temperature at which the reaction rate of the above chemical formula (1) is the highest is between the upper threshold value temperature and the lower threshold value temperature. For the aqueous shift reactor 33, the upper threshold value temperature and the lower threshold value temperature are set in the control section 70 so that the temperature at which the reaction rate of the above chemical formula (3) is the highest is between the upper threshold value temperature and the lower threshold value temperature. For the selective oxidation reactor 34, the upper threshold value temperature and the lower threshold value temperature are set in the control section 70 so that the temperature at which the reaction rate of the above chemical formula (4) is the highest is between the upper and the lower threshold value temperatures. It is to be noted that the temperature of the heat generating resistive film 47 may be converted from the current flowing through the heat generating resistive film 47 (note that the power supply section 60 has the constant voltage), may be converted from the voltage applied to the heat generating resistive film 47 (note that the power supply section 60 has the constant current), or may be converted from both the voltage and current.

As described above, according to the embodiment of the present invention, the diffusion preventing layer 47b preventing the diffusion due to the heat generation of the heat generating layer 47a and the cohering layer 47c to enhance the cohesion strength between the diffusion preventing layer 47b and the surface of the substrate 41 are provided between the heat generating layer 47a of the heat generating resistive film 47 and the substrate 41, thereby making it possible to enhance temperature measurement accuracy of the heat generating section 80.

Furthermore, when the current and voltage corresponding to the temperature state of the heat generating resistive film 47 are measured to calculate the electric resistance of the heat generating resistive film 47 and a difference is made between the temperature uniquely defined by the electric resistance and a desired proper temperature, operation can be performed only with the lead wires 48, 49 as the wires exposed from the heat generating resistive film 47 because the heat generating resistive film 47 serves as both heating means and the temperature sensor to control and change the current flowing through the heat generating resistive film 47 and the voltage applied to the heat generating resistive film 47 for an optimum temperature range. In other words, the electric power is supplied from the power supply section 60 to the heat generating resistive film 47 through the lead wires 48, 49, and the voltage applied to the heat generating resistive film 47 and the current flowing through the heat generating resistive film 47 are measured through the lead wires 48, 49. Since the lead wires 48, 49 serve as both wires for power supply and wires to measure the temperature of the heat generating resistive film 47, it is not necessary to separately provide a wire or wires to measure the temperature in the micro flow path 43 and lead the wire from the inside of the micro flow path 43 to the outside of the box 50. Therefore, the present embodiment can achieve fewer wires with good conduction than before, leading to reduced heat loss through the wires.

The rate of heat loss through the wires increases as the vaporizer 31, the steam reforming reactor 32, the aqueous shift reactor 33 and the selective oxidation reactor 34 become smaller, but because the lead wires 48, 49 are the only wires that are led from the micro flow path 43 to the outside of the box 50 in the present embodiment, the rate of heat loss through the lead wires 48, 49 is not significantly increased even if the vaporizer 31, the steam reforming reactor 32, the aqueous shift reactor 33 and the selective oxidation reactor 34 are reduced in size. Therefore, in terms of the heat loss, the vaporizer 31, the steam reforming reactor 32, the aqueous shift reactor 33 and the selective oxidation reactor 34 are suitable for size reduction.

The heat generating resistive films 47 of the vaporizer 31, the steam reforming reactor 32, the aqueous shift reactor 33 and the selective oxidation reactor 34 serve not only to heat the air-fuel mixture in the micro flow paths 43 of the vaporizer 31, the steam reforming reactor 32, the aqueous shift reactor 33 and the selective oxidation reactor 34, but also to measure the temperature in the micro flow paths 43, so that no element for temperature measurement needs to be provided in the micro flow paths 43. Thus, manufacturing processes of the vaporizer 31, the steam reforming reactor 32, the aqueous shift reactor 33 and the selective oxidation reactor 34 are simplified.

Figure 13:
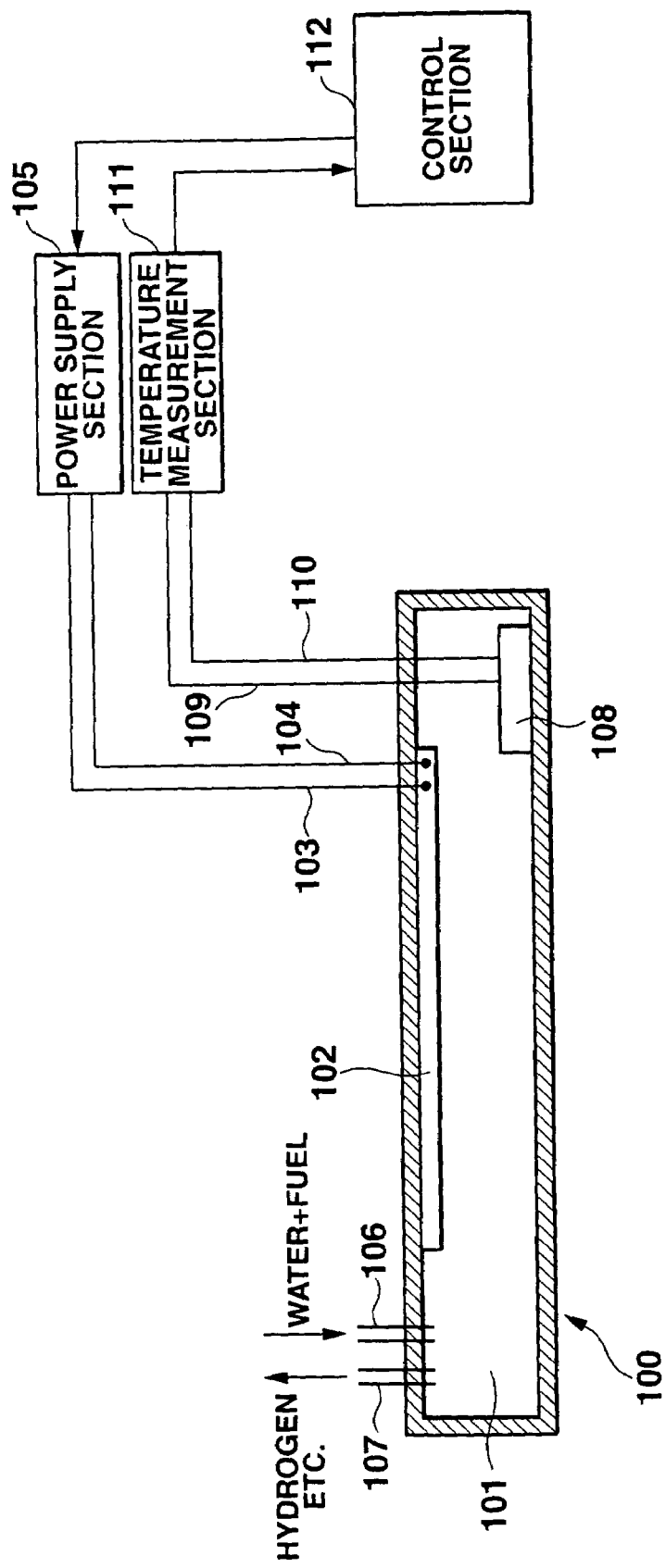
FIG. 13 is a figure showing a conventional reformer.

Furthermore, as a thermocouple measures a temperature difference between two contact points, a zero point correction must be performed in the opposite contact point. Therefore, conventional circuitry of the temperature measurement section 111 as shown in FIG. 13 is complicated, but the temperature in the micro flow path 43 can be measured without the zero point correction in the present embodiment, so that circuitry to measure the voltage or current in the power supply section 60 is simpler than the circuitry of the temperature measurement section 111.

The present invention is not limited to the embodiments described above, and various modifications and design alterations may be made without departing from the spirit of the present invention.

For example, the air-fuel mixture to be thermally treated and reacted in the reforming means 3 has contained methanol and steam, but may contain hydrogen elements, and may be the air-fuel mixture of other alcohols and steam and may also be the air-fuel mixture of gasoline and water. However, it is preferable to change the kind of the reforming catalytic film 46 depending on the kind of air-fuel mixture.

Furthermore, the internal spaces formed in the vaporizer 31, the steam reforming reactor 32, the aqueous shift reactor 33 and the selective oxidation reactor 34 have been the micro flow paths 43 in the above embodiments, but may simply be hollow chambers.

Still further, in the above embodiments, the vaporizer 31, the steam reforming reactor 32, the aqueous shift reactor 33 and the selective oxidation reactor 34 are sealed in the boxes 50 and stacked, so that a total of eight pipes including the supply pipes 44 and the discharge pipes 45 is exposed and heat leaks therefrom to the outside. However, if the vaporizer 31, the steam reforming reactor 32, the aqueous shift reactor 33 and the selective oxidation reactor 34 are all provided in a set of substrates 41, 42 and sealed in one box 50, a total of two pipes including the supply pipe 44 and the discharge pipe 45 may be exposed from the box 50 in the whole reforming means 3. Moreover, the vaporizer 31, the steam reforming reactor 32, the aqueous shift reactor 33 and the selective oxidation reactor 34 in a stacked state may be sealed in one box 50.

Further yet, both the aqueous shift reactor 33 and the selective oxidation reactor 34 are applied as carbon monoxide removers to remove by-product carbon monoxide in the embodiments described above, but only one of which may be applied as long as it can bring the density of carbon monoxide to a degree sufficiently less toxic.

Further yet, the groove is formed in only one surface of the substrate 41 in the above embodiments, but the groove may be formed in only one surface of the substrate 42, and the groove may be covered with the surface of the substrate 41 in which the groove is not formed in order to form a flow path. Alternatively, the grooves may be formed in the opposite surfaces of the substrate 41 and the substrate 42, and the grooves opposite to each other may be superimposed to produce a flow path. When the grooves are provided in both the substrate 41 and the substrate 42, the cross sectional area of the groove perpendicular to the running direction of the groove can be increased, thus enabling the reaction to be more rapid. On the contrary, if the cross sectional area is set to be equal to the cross sectional area for the groove formed in only one surface, the depth of the grooves in the substrate 41 and the substrate 42 will be half, so that parts under the grooves have larger thickness, and it is possible to prevent cracks from being caused due to the groove which is a thin part of the substrate.

Furthermore, the heat generating resistive film 47 may be provided only on an outer surface of the substrate 41 or may be provided only on an outer surface of the substrate 42, or the substrate 41 and the substrate 42 may each be provided with one heat generating resistive film 47.

What is claimed is:

1. A thermal treatment apparatus provided on a substrate comprising:
   (i) a heat generating section which includes:
       a heat generating layer which is made of a material containing Au, and whose electric resistance increases as its temperature increases;
       a diffusion preventing layer which contacts one surface of the heat generating layer to prevent diffusion of the material of the heat generating layer due to heat generation of the heat generating layer; and
       a cohering layer disposed between the substrate and the diffusion preventing layer;
   (ii) a power supply section which at least one of: (a) applies a voltage to the heat generating section, and (b) passes a current through the heat generating section, to heat the heat generating section; and
   (iii) a control section which reads a resistance of the heat generating section from the at least one of the voltage and the current applied to the heat generating section, and reads a temperature of the heat generating section based on the resistance, and which controls the power supply section to control the temperature of the heat generating section.

2. The thermal treatment apparatus according to claim 1, wherein the diffusion preventing layer contains W, and the cohering layer contains at least one of Ta, Mo, Ti, Cr and TiN.

3. The thermal treatment apparatus according to claim 1, wherein the cohering layer contains at least one of Ta, Mo, Ti, Cr and TiN.

4. The thermal treatment apparatus according to claim 1, wherein the heat generating layer has a thickness ranging from 100 nm to 700 nm.

5. The thermal treatment apparatus according to claim 1, wherein the diffusion preventing layer has a thickness ranging from 50 nm to 100 nm.

6. The thermal treatment apparatus according to claim 1, wherein the cohering layer has a thickness ranging from 50 nm to 100 nm.

7. The thermal treatment apparatus according to claim 1, wherein the heat generating section is provided in a vaporizer which vaporizes a liquid fuel.

8. The thermal treatment apparatus according to claim 1, wherein the heat generating section is provided in a reforming reactor which reforms a fuel to produce hydrogen.

9. The thermal treatment apparatus according to claim 1, wherein the heat generating section is provided in a carbon monoxide remover which removes carbon monoxide.

10. The thermal treatment apparatus according to claim 1, further comprising:
    a reformer which reforms a fuel to produce hydrogen by heat from the heat generating section; and
    a fuel cell which generates electric power with the hydrogen produced by the reformer.

11. The thermal treatment apparatus according to claim 10, wherein the power supply section uses the electric power generated by the fuel cell to heat the heat generating section.

12. A power generation module comprising: (i) a heat generating section which comprises a substrate, a heat generating layer which is made of a material containing Au, and whose electric resistance increases as its temperature increases, a diffusion preventing layer which contacts one surface of the heat generating layer to prevent diffusion of the material of the heat generating layer onto a side of the substrate, and a cohering layer disposed between the substrate and the diffusion preventing layer;
    (ii) a power supply section which at least one of: (a) applies a voltage to the heat generating section, and (b) passes a current through the heat generating section, to heat the heat generating section;
    (iii) a control section which reads a resistance of the heat generating section from the at least one of the voltage and the current applied to the heat generating section and reads a temperature of the heat generating section based on the resistance, and which controls the power supply section to control the temperature of the heat generating section;
    (iv) a reformer which reforms a fuel into hydrogen by heat generation of the heat generating section; and
    (v) a fuel cell which generates electric power with the hydrogen reformed by the reformer.

13. The power generation module according to claim 12, wherein the diffusion preventing layer contains W, and the cohering layer contains at least one of Ta, Mo, Ti, Cr and TiN.

14. A thermal treatment apparatus provided on a substrate comprising:
    (i) a heat generating section which includes:
        a heat generating layer which is made of a material containing Au, and whose electric resistance changes according to a temperature change so that a resistance ratio $R(T)/R(0)$ returns to an original value when the temperature is increased from a room temperature and again brought to the room temperature, wherein the $R(T)$ represents a resistance of the material of the heat generating layer at a temperature of $T°$ C., and the $R(0)$ represents a residual resistance which is a resistance of a region in the heat generating layer whose resistance does not change by the temperature change;
        a diffusion preventing layer which contacts one surface of the heat generating layer to prevent diffusion of the material of the heat generating layer due to heat generation of the heat generating layer; and
        a cohering layer which is disposed between the substrate and the diffusion preventing layer,
    (ii) a power supply section which at least one of: (a) applies a voltage to the heat generating section, and (b) passes a current through the heat generating section, to heat the heat generating section; and
    (iii) a control section which reads a resistance of the heat generating section from the at least one of the voltage and the current applied to the heat generating section and reads a temperature of the heat generating section based on the resistance, and which controls the power supply section to control the temperature of the heat generating section.

15. A power generation module comprising:
    (i) a heat generating section which includes:
        a heat generating layer which is made of a material containing Au, and whose electric resistance changes according to a temperature change so that a resistance ratio $R(T)/R(0)$ returns to an original value when the temperature is increased from a room temperature and again brought to the room temperature, wherein the $R(T)$ represents a resistance of the material of the heat generating layer at a temperature of $T°$ C., and the $R(0)$ represents a residual resistance which is a resistance of a region in the heat generating layer whose resistance does not change by the temperature change;

a diffusion preventing layer which contacts one surface of the heat generating layer to prevent diffusion of the material of the heat generating layer due to heat generation of the heat generating layer; and a cohering layer which is disposed between a substrate and the diffusion preventing layer;

(ii) a power supply section which at least one of: (a) applies a voltage to the heat generating section, and (b) passes a current through the heat generating section, to heat the heat generating section;

(iii) a control section which reads a resistance of the heat generating section from the at least one of the voltage and the current applied to the heat generating section and reads a temperature of the heat generating section based on the resistance, and which controls the power supply section to control the temperature of the heat generating section;

(iv) a reformer which reforms a fuel into hydrogen by the heat generation of the heat generating section; and (v) a fuel cell which generates electric power with the hydrogen reformed by the reformer.

* * * * *